US012679063B2

(12) United States Patent
Sandberg

(10) Patent No.: US 12,679,063 B2
(45) Date of Patent: Jul. 14, 2026

(54) MULTI-LAYER MATERIAL FOR PRESS MOLDING, A DELIVERY SYSTEM AND A RESULTING FIBER PRODUCT

(71) Applicant: Blue Ocean Closures AB, Karlstad (SE)

(72) Inventor: Lars Sandberg, Hammarö (SE)

(73) Assignee: Blue Ocean Closures AB, Karlstad (SE)

( * ) Notice: Subject to any disclaimer, the term of this patent is extended or adjusted under 35 U.S.C. 154(b) by 0 days.

(21) Appl. No.: 18/848,183

(22) PCT Filed: Mar. 21, 2023

(86) PCT No.: PCT/EP2023/057225
§ 371 (c)(1),
(2) Date: Sep. 18, 2024

(87) PCT Pub. No.: WO2023/180328
PCT Pub. Date: Sep. 28, 2023

(65) Prior Publication Data
US 2025/0205990 A1     Jun. 26, 2025

(30) Foreign Application Priority Data
Mar. 21, 2022    (SE) .................................... 2250345-2

(51) Int. Cl.
*B31F 1/00*        (2006.01)
*B32B 29/00*        (2006.01)

(52) U.S. Cl.
CPC .......... *B31F 1/0077* (2013.01); *B32B 29/005* (2013.01); *B32B 2250/03* (2013.01); *B32B 2250/26* (2013.01); *B32B 2262/02* (2013.01);
*B32B 2307/54* (2013.01); *B32B 2307/718* (2013.01); *B32B 2307/72* (2013.01); *B32B 2435/02* (2013.01); *B32B 2439/00* (2013.01)

(58) Field of Classification Search
CPC . B31F 1/0077; B32B 29/005; B32B 2250/26; B32B 2262/02; B32B 2307/54; B32B 2307/718; B32B 2307/72; B32B 2435/02; B32B 2439/00
USPC ............................................ 493/51, 52, 167
See application file for complete search history.

(56) References Cited

U.S. PATENT DOCUMENTS

| | | | |
|---|---|---|---|
| 4,242,398 A | 12/1980 | Segawa et al. | |
| 2002/0012759 A1 | 1/2002 | Asayama et al. | |
| 2003/0155088 A1 | 8/2003 | Norlander | |

(Continued)

FOREIGN PATENT DOCUMENTS

| | | |
|---|---|---|
| EP | 1160379 A2 | 12/2001 |
| EP | 3736099 A1 | 11/2020 |

(Continued)

OTHER PUBLICATIONS

International Search Report and Written Opinion dated Jun. 15, 2023, from PCT Application No. PCT/EP2023/057225.

(Continued)

*Primary Examiner* — Linda J. Hodge
(74) *Attorney, Agent, or Firm* — Joseph T. Leone; Yanjun Ma; DeWitt LLP

(57) ABSTRACT

The present invention relates to a multi-layer material for press molding, a delivery system and a resulting fiber product. Also, a method for recovery is disclosed.

23 Claims, 2 Drawing Sheets

(56) References Cited

U.S. PATENT DOCUMENTS

| | | | |
|---|---|---|---|
| 2008/0193687 A1 | 8/2008 | Asayama et al. | |
| 2010/0150479 A1 * | 6/2010 | Smith ................ | B65D 33/2508 |
| | | | 383/61.3 |
| 2010/0190020 A1 | 7/2010 | Frederiksen et al. | |
| 2018/0311940 A1 * | 11/2018 | Toft ...................... | B65D 5/065 |
| 2020/0308768 A1 | 10/2020 | Räsänen et al. | |
| 2020/0318292 A1 * | 10/2020 | Aldén ................... | D21H 17/09 |
| 2021/0069942 A1 | 3/2021 | Larsson et al. | |
| 2021/0155368 A1 | 5/2021 | Binshtok et al. | |
| 2024/0051283 A1 * | 2/2024 | Zimmer ............... | B32B 29/005 |
| 2024/0416635 A1 * | 12/2024 | Ljungqvist ............. | B32B 37/12 |

FOREIGN PATENT DOCUMENTS

| | | | | |
|---|---|---|---|---|
| KR | 102429942 B1 * | 8/2022 | ........... | B32B 29/005 |
| KR | 102747506 B1 * | 12/2024 | ............. | D21H 17/33 |
| WO | WO-0014333 A1 * | 3/2000 | ............. | D21F 11/04 |
| WO | WO 2014142714 A1 | 9/2014 | | |
| WO | WO 2020165780 A1 | 8/2020 | | |
| WO | WO 202159219 A1 | 4/2021 | | |
| WO | WO-2023078834 A2 * | 5/2023 | ........... | B29C 70/865 |
| WO | WO-2023110282 A1 * | 6/2023 | ............. | B31F 1/0077 |

OTHER PUBLICATIONS

Swedish Search Report dated Sep. 29, 2022, from Patent Application No. 2250345-2.
Notice from Swedish Patent and Registration Office dated Apr. 15, 2024, from Patent Application No. 2250345-2.

* cited by examiner

MULTI-LAYER MATERIAL FOR PRESS MOLDING, A DELIVERY SYSTEM AND A RESULTING FIBER PRODUCT

FIELD OF THE INVENTION

The present invention relates to relates to a material for press molding of a fiber product, intended to be formed at high pressure and high temperature, preferably by means of a press pad device and a stamp device, wherein said material results in a fiber product. It also relates to an efficient delivery system to such press molding and a resulting product with enhanced mechanical and resistive properties. It also relates to a three-layer material concept for enhanced product and recycling properties. It also relates to a method for recovery.

BACKGROUND

A fiber product can be made by pressing a web or a sheet of fibers. Typically, a combination of natural fibers (e.g. wood pulp fibers), synthetic fibers (e.g. polyolefin based fibers which may be polyethylene or polypropylene) and other additives such as binder or dye. In some applications it is preferred that such a web essentially merely comprises of natural fiber, with or without additives. Typical process conditions are 150-250° C. and pressures 100-10000 bar (200-2000 Bar). Moisture content may typically be less than 20%. In many applications the material is produced in an integrated operation in line with the pressing operation in order to offer enough forming flexibility through using a material with little internal strength. Examples of known methods described above are shown in EP 3736099 and WO2020/165780. The fiber product can be in the form of a hollow product, for example a package or a closure (lid, screw cap or similar), but can also be a flat product. Products can be formed from a web of the material and punched/cut in connection with forming, e.g. that have been completely or partially separated from the web to allow deeper shaping. This exposure is typically done by cutting the material into a shape that is adapted to the final shape in direct proximity to the forming process. Typically, for example, a roundel is cut to form a round package.

The press molding typically takes place with two tools where both the outer tool (pad) and the inner tool (stamp) can consist of several parts to enable discharge of the finished product. Typically, the pad opens while the stamp collapses. The piston, parts of the piston or parts of the pad can also be made of a compressible material which enables greater vertical compressive forces, typically against the sides of the cavity, by the tool material being reshaped during the compression.

If the material is not produced (or laid) in direct proximity or in line with the stamping and forming process, it needs to have some strength (physical properties) two withstand the operations of for example production, drying, cutting into roll width, winding, unwinding cutting into blanks and the feeding operations. Typically, the material is exposed to tensile forces from line tension and share forces from cutting and handling. The material will also need a certain stiffness, predominantly bending stiffness, for example for handling and feeding operations. Specifically, the surface of the material when stored, for example in a roll or on a distribution pallet, risk to interlock or fuse with connecting surfaces causing a material that is hard to separate, dusting when separating or that is damaged when being separated. This is a known problem also with strong materials and referred to as blocking but the problem becomes much bigger with the soft or less defined material typically used in press forming.

Normally fiber materials for 3D pressed or folded packing products are delivered flat in one out of three main ways: on rolls, sheets or blanks. The downside with the existing methods is that rolls have a poor volume efficiency, both from the round shape as such and from the void created by the central unwinding core. For blanks and sheets the volume efficiency can be very high but the nature of this system is that the material is cut into individual items creating additional complication and complexity in the feeding system increasing cost and lowering production efficiency.

When the material is formed into a product, the internal bonds between a number of fibers need to be low or non-existing. This is due to that the material partly shifts shape through that fibers are partly reorganized or at least through that bonds are broken, for example through delamination. Typically, in press forming operations, there is an optimum moisture content of the material. As fiber-based materials typically get weaker when at a higher moisture content. This put extra demand on the original strength and relative wet strength properties of the ingoing material.

The final product will need to have certain minimum strength and resistive properties. These are partly guided by the process parameters such as pressure, temperature and forming time but also from the material constitution and additives. In some applications the strength and resistive properties might need to be higher on the surface on the top and bottom or inside and outside of the product. For example, a packing product will have extra stress on the outside from handling and on the inside from interaction with packed products. For items having some kind of closing mechanism, the stress comes from interaction between the different parts of the opening mechanism, for example interaction between lid and container or between inside and outside threads.

Many of the final products will be submitted to recycling where the fibers are separated to be used in new products. This puts special demand on the product so that only a minimum amount of fibers are bonded in a way so that they cannot be separated in a recycling operation, typically a re-pulping operation. As the re-pulping operation benefits from thinner materials and objects it is an advantage if weaker layers are introduced allowing the object to delaminate to delaminate and the resulting tougher layers to be better exposed to the re-pulping operation and be separated more efficient.

Thus, there are still need for providing products which are easily recyclable and/or compostable.

SUMMARY OF THE INVENTION

The present invention solves/alleviates one or more of the problems by providing according to a first aspect a multi-layer substrate comprising at least one layer providing tensile strength and one layer containing fibers with an internal strength low enough to be formed in a press forming operations, forming new bonds in, at least partly, new relative positions.

Also, according to a second aspect of the present invention there is provided method for treating a multilayer substrate according to any one of the preceding claims for providing a multilayer product comprising the following steps:

a) providing said multilayer substrate, b) subjecting said substrate to high pressure, and c) subjecting said substrate to high temperature, thus providing a multilayer product.

Also, according to a third aspect of the present invention there is provided a multilayer product obtainable by a method according to the second aspect.

Also, according to a fourth aspect of the present invention there is provided use se of a multilayer product according to the third aspect wherein said product is/are a part(s) of a moulded product, such as a screw cap, a container, a bread clip or a package, wherein said container may be a disposable drinking cup or dairy product carton or auto-clave package or a tray, or a plate for eating or keeping food, or a paper or paperboard, such as a folding boxboard.

Also, according to a fifth aspect of the present invention there is provided a method for recycling a multilayer product according to the third aspect for providing re-cycled pulp comprising the following steps:

i) providing said multilayer product, preferably after usage thereof, ii) submerging said product into a liquid, preferably water, most preferred warm water, iii) optionally adding to said liquid one or more decoupling agents, iv) exposing said product in said liquid for shear forces thus providing a re-cycled pulp.

DETAILED DESCRIPTION OF THE INVENTION

The expressions "fibre" or "fiber" may be used interchangeably in the present specification and would have the same meaning.

According to a preferred embodiment of the first aspect said layer providing tensile strength provides a tensile strength that is at least about 10%, preferably at least about 20%, most preferred at least about 50%, higher than the tensile strength of the other layer.

According to a preferred embodiment of the first aspect said substrate is at least a three-layer material. Said substrate may further have more layers than three, such as four, five, six, seven, eight, nine or ten layers.

According to a preferred embodiment of the first aspect said higher tensile strength is provided by at least one of the outer layers, preferably wherein the minimum tensile strength is about 75 N/m (CD). CD=Cross-machine direction According to a preferred embodiment of the first aspect said higher tensile strength is provided by the two outer layers, preferably wherein the total minimum tensile strength is about 150 N/m (MD). Thus, said layers provide for about 75 N/m, whereas the middle layer provides with an essentially minor part. MD=Machine direction According to a preferred embodiment of the first aspect the layer(s) with higher tensile strength is thinner than the central layer(s).

According to a preferred embodiment of the first aspect the material with low initial tensile strength provides one or more layer(s) with better re-pulpability.

According to a preferred embodiment of the first aspect, at least one of the outer layers has a higher hydrophobicity hydrophobicity and/or oleophobicity, preferably by using a water and/or grease repellent, such as AKD (alkylketendimer), ASA (alkenyl succinic anhydride) or waxes or a combination thereof. This may be achieved for said at least one of the outer layers, or both, as follows:

In the method, a bulky cellulosic material (which may have a specific volume of from about 7 to about 8 cm$^3$/g) is pressed after going through a decurler unit, whereby a water and/or grease repellent is applied before pressing (using e.g. spraying). Said cellulosic material may be wet or air-laid. The combination of pressure (from about 10 to about 100 MPa, preferably from about 20 to about 30 MPa) and heat (from about 120 to about 250° C., preferably from about 120 to about 180° C.) is applied to the material for 0.5-2 s and this yields a high-density cellulose object (from about 1.11 to about 1.25 kg/dm$^3$) with a relatively limited porosity and a relatively capillary-free structure. This process affects the material in several ways:

a) the high temperature at which the material is pressed allows to heat the fibre mat above the melting point of the agent used for water/grease repellency. This allows the agent to redistribute/spread more evenly on/around the fibres during pressing and reach a more homogeneous fibre coverage, and therefore a higher hydrophobicity and/or oleophobicity.

b) The extremely high densification of the material during pressing yields a smooth, closed surface object with low specific volume when compared to other cellulosic materials such as paperboard or wet moulded cellulose. The densification of the fibre network allows for the creation of a network of hydrophobic and/or oleophobic agent (i.e. water and/or grease repellent) around the fibres that is then locked in the structure due to the lack of available space to flow. Moreover, the smooth, closed surface further reduces the flowing possibility and locks the agent in the material, as well as decrease the possibility of hydrolysis, therefore increasing the performance. Finally, the densification of the material increases the volume fraction of hydrophobic and/or oleophobic agent (i.e. water and/or grease repellent) in a given amount of material, leading to a further densification of the network and increase in performance.

Decurler-units that may be used in connection with the above-mentioned method may be e.g. a roll-decurl component provided by Maxson Automatic Machinery Company or a decurl unit provided by Ricoh. Said decurl unit may comprise one sponge roller, two metal rollers and two paths for paper or other cellulosic material. The decurl strength and curl direction may be adjusted. There may be a "sandwich" configuration wherein there is an upper pressure roller, a decurl roller and a lower pressure roller.

According to a preferred embodiment of the first aspect at least one of the outer layers has a higher relative wet strength.

According to a preferred embodiment of the first aspect at least one of the outer layers has a higher density.

According to a preferred embodiment of the first aspect the density is below about 0.5 kg/dm$^3$, preferably from about 0.1 to about 0.4 kg/dm$^3$.

According to a preferred embodiment of the first aspect the grammage is from about 100 to about 2000 g/m$^2$, preferably from about 300 to about 1500 g/m$^2$. If tissue paper is used as a starting material for one layer, preferably an outer layer, it may have a grammage of from about 15 to about 18 g/m$^2$, preferably about 16.5 g/m$^2$.

According to a preferred embodiment of the first aspect the moisture content is from about 4 to about 25%, preferably from about 7 to about 15%.

According to a preferred embodiment of the first aspect at least one of the outer layers comprises one or more additives for extra strength and wet strength, preferably wherein at least one component of said additive(s) comprises fibers of man-made polymers.

The substrate mentioned above for the embodiments of the first aspect may emanate from CTMP (ChemiThermo Mechanical Pulp), TMP (Thermo Mechanical Pulp), Kraft pulp, sulfate pulp, sulfite pulp, recycled pulp material, pulp for board or carton, or a combination thereof. Further said substrate may emanate from bleached or nonbleached pulp, or a combination thereof. Additionally, said substrate may emanate from hardwood or softwood, bagasse or straw or a combination thereof.

According to a preferred embodiment of the second aspect the high pressure and high temperature of step b and/or c) is provided by a press pad device and a stamp device.

According to a preferred embodiment of the second aspect the substrate emanates from CTMP (ChemiThermo Mechanical Pulp), TMP (Thermo Mechanical Pulp), Kraft pulp, sulfate pulp, sulfite pulp, recycled pulp material, board or carton, or a combination thereof.

According to a preferred embodiment of the second aspect the substrate emanates from bleached or non-bleached pulp, or a combination thereof.

According to a preferred embodiment of the second aspect the substrate emanates from hardwood or softwood, bagasse, algae or straw or a combination thereof.

According to a preferred embodiment of the second aspect the step a) is preceded by a delivery step comprising forming the substrate into a strip and subsequently folding said strip.

According to a preferred embodiment of the third aspect the multilayer product according to the third aspect is a moulded product, such as a screw cap, a container a bread clip or a package, wherein said container may be a disposable drinking cup or dairy product carton or autoclave package or a tray, or a plate for eating or keeping food, or a paper or paperboard, such as a folding boxboard.

According to a preferred embodiment of the third aspect the multilayer product is provided so that one of the outer layers form threads or click-on function for sealable packaging, for example a container, a closure or a part of container or closure.

Thanks to the present invention a material that can be used in press forming operations, where fibers can be partly separated and re-attached, can be produced to have a higher tensile, share and surface strength and be feed into the forming operation in an efficient way.

In addition, outer layer and surface properties of a formed product can be strong and resistant enough at the same time as the amounts of strengths agents are minimized and high re-pulpability and therefor high recyclability is maintained.

In one application of the invention the multi-layer materials are folded in or prior to the pressing and forming operations, thereby creating internal structures of stronger material where the outer layers interact. In this way a structure may be locally reinforced while minimizing use of strength additives and withholding recyclability.

The novel material in this invention allows through its tensile strength and handling properties for new delivery systems where the material can be delivered in a strip folded on a pallet.

This has two distinct advantages to production of items, specifically high-volume packaging items. The delivery method is made possible through using the strong but soft material resulting from the multi-layer structure where the strength and possibility to fold without creating creases that influence the final product, allows for a system with high volume efficiency. As the folding are creating a block of a continues material it combines the volume efficiency of sheets on a pallet with the production advantage with a continually feed material as from a roll.

Preferred features of each aspect of the invention are as for each of the other aspects mutatis mutandis. The prior art document(s) mentioned herein are incorporated to the fullest extent permitted by law. The invention is further described in the following example, together with the appended figures, which do not limit the scope of the invention in any way.

Embodiments of the present invention are described as mentioned in more detail with the aid of example of embodiments, together with the appended figures, the only purpose of which is to illustrate the invention and are in no way intended to limit its extent.

FIGURES

EXAMPLES

1. Exemplary Description
   A. Forming of a first outer or inner layer
   B. Forming of a second central layer
   C. Forming of a third layer outer or inner layer
   D. Additional manufacturing processes where the material is exposed to mechanical or chemical stress. Mechanical stress is typically enforced through compression (calendaring) and tensile stress in mechanical or drying operations. Chemical stress are typically enforced trough moisture or water for example from an operation adding a water solvable or dispersible additive.
   E. Winding operation where the material is exposed to tensile forces in order to create a stable enough roll. If the tension in the winding operation are not high enough the tension inside the roll will not be sufficient to prevent so called telescoping in handling.
   F. Rewinding operation where the web tension is needed to pull the material from the larger original roll and high enough to create sufficient web tension in the smaller resulting roll in order to enable safe handling. The tension is typically achieved through that the smaller roll is driven and that the rotation of the bigger roll is held back or braked.
   G. Unwinding in the converting operation. The web tension creating tensile forces of the material is needed to create a flat and controlled web. This is typically achieved through that the material is pulled by a feeding unit and that the roll is held back through a braking mechanism. Unwinding means that the layers of the roll where the inside material rests towards the outside of the material needs to be separated creating tensile forces but also out of plane or share forces risking the material to break, dust or that part of once surface resides on the other if the surface strength of the material is not high enough.

H. In some operations the material is cut into blanks prior to the feeding operation creating tensile and share forces on the material.

Figure 1:
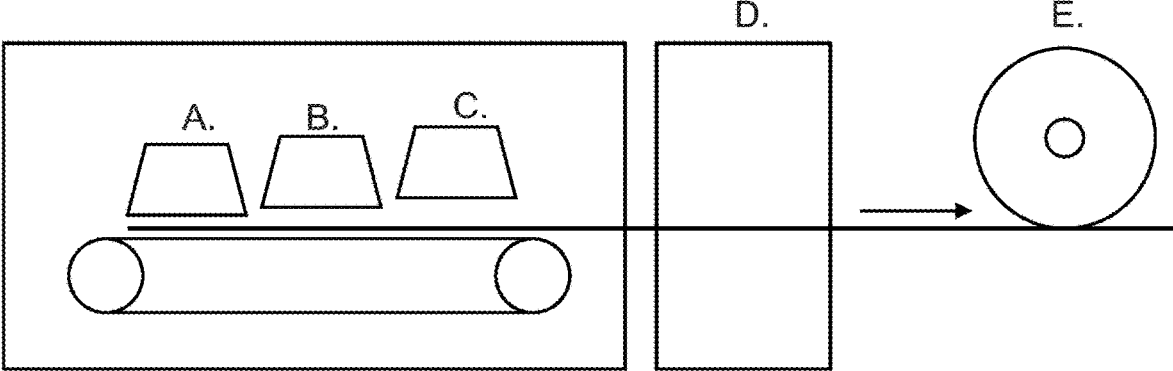
FIG. 1 shows a schematic production of a multi-layer material according to the present invention where, typically one or both of the outer formed layers, are strong and carry the loose held together other layers.
Figure 2:
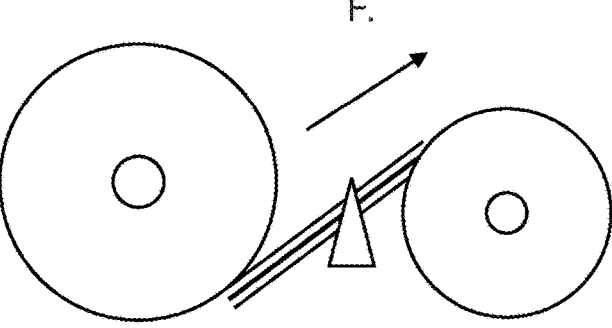
FIG. 2 shows a schematic slitting operation where a bigger roll of the internally loose held together material is re-winded and slitted to several smaller rolls adopted thereby exposed to high tensile tension in the web and share forces from the slitting operations.
Figure 3:
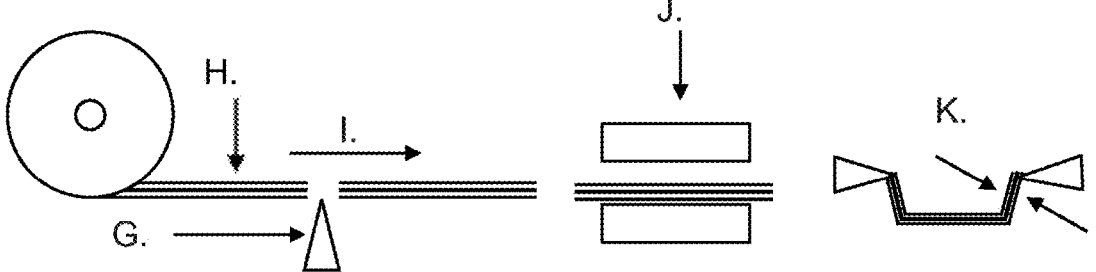
FIG. 3 shows a schematic forming operation where the partly loose held together fiber material are un-winded, cut, pulled, draped pressed and possible post cut into a multilayer structure with extra strong inside and/or outside surfaces.
Figure 4:
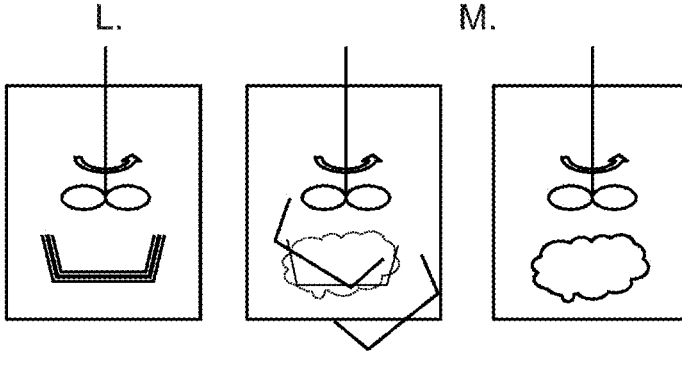
FIG. 4 shows a schematic multilayer formed structure where one or both of the outer layers has a higher resistance towards the re-pulping operations while the central layer is more easily separated and through that delaminating the structure increasing re-pulpability and through that recyclability.

I. The material, as a web or as sheets (or blanks) are typically fed into the pressing operation (J.) through a pushing operation by the feeder in order to avoid tensile forces then the material later is punched or draped into the mould (see FIGS. 1 and 2 "press pad device"). The pushing operation create compressive and buckling forces on the material demanding that the material is strong and stiff enough not to be compressed, folded or buckled when fed.

J. Pressing device (reference also to FIGS. 1 and 2 below). The material is typically pushed flat into the pressing area and then pushed or draped into the press pad device with the stamp or with a dedicated tool. The material needs to be strong enough not to brake from tensile or share forces crated from the pressing device and the walls of the pad and the same times a significant amount of fibers need to be loose enough to be reloessentially no strength in the middle layer. Thus, in each outer layer there would be a tensile strength of about 75 N/m (CD).

L. After use the fibers in the item need to be recycled enable new use as packaging or other products. This is typically done trough that the item is collected, transported and, tougher with other fiber and paper products re-pulped. The re-pulping, which constitutes the fifth aspect of the present invention, is typically done in an operation where the items are submerged into warm water, with or without decoupling, agents and exposed to share forces causing fibers bonds to separate. Typically, stronger bonds, bonds that are aided with additives and thick structures are harder to re-pulp.

M. The multilayer where one or several layers are easier will delaminate or partly delaminate causing the easier to re-pulp layers to separate into single fibers. The harder to separate layers will end up as thinner layers or flakes and through that geometrical transformation they separate to single fibers easier than if they were kept in a thicker structure. If all or part of the stronger layer would not separate totally these will be screened of enabling the major part of the structure to be recycled into new paper or fiber products.

2. Measurements

If air-laid trial material (carrier sheet), that is a multi-layered material according to the present invention, has been treated during a trial and is subsequently measured with regard to e.g. tensile strength conducted on the full material (including tissue), data (testing results) can be collected and may be represented as follows:

| Parameter | Test Method | Unit | Targ | LSL | USL |
|---|---|---|---|---|---|
| Basis Weight | EN 12625-6 | $(g/m^2)$ | 16.5 | 15 | 17.5 |
| Thickness | EN 12625-3 | $(\mu m)$ | 1300 | | |
| Tensile Strength MD dry | EN 12625-4 | (N/m) | 150 | 120 | |
| Elongation MD | EN 12625-4 | (%) | 25 | 20 | |
| Air permeability | Internal Method DPMK 001 | (l/m2/s) | 2400 | 1870 | |
| Moisture | EN 287 | % | 5.5 | | 6 | cated under the pressing operation. During the pressing operation the material will be formed and with new bonds formed. The nature of the material and the additives added will determine the properties of the new laminate structure. Typically, materials will contain strength, wet-strength and hydrophobic properties and may be stronger and/or more resistant to water while materials without these additives will create properties enabling better re-pulping properties. Where the material is folded in the pushing down or draping operation it will for folds where the inside or outside material will come in direct contact with itself forming, typically stronger, re-enforcement structures.

K. The forming and pressing operation results in a multi-layer structure typically with the outer and/or inner layers are given extra strength from the additives originally added to create a or several strong layers in the manufacturing and converting operations. If the item formed is to be cut after forming, the strength of outer(s) aid the cutting operation through better share and bending resistance.

The formed product would benefit from extra strength.

As a non-limiting example, the minimum tensile strength could be 150 N/m (MD) in total, where there would be Elongation and air permeability of the tissue carrier are two important parameters for converting on the air-laid machine.

Additional measurements on an exemplary thermobonded air-laid, tissue carrier, gave the following values:

| Property | Value/Unit | Test method |
|---|---|---|
| Basis weight | 700 $g/m^2$ | NWSP 130.1.R0 (15) |
| Thickness (2.0 kPa) | 5.6 mm | NWSP 120.6.R0 (15) |
| Density | 0.13 $g/cm^3$ | Calculated |
| Tensile strength (dry) MD | 49 N/50 mm | NWSP 110.4.R0 (15) |
| Tensile strength (dry) CD | 46 N/50 mm | NWSP 110.4.R0 (15) |
| Elongation (dry) MD | 1.02% | NWSP 110.4.R0 (15) |
| Elongation (dry) CD | 1.31% | NWSP 110.4.R0 (15) |
| Bond Strength | 0.2 N/50 mm | |

Various embodiments of the present invention have been described above but a person skilled in the art realizes further minor alterations that would fall into the scope of the present invention. The breadth and scope of the present invention should not be limited by any of the above-described exemplary embodiments but should be defined only in accordance with the following claims and their equivalents. For example, any of the above-noted layered configurations or methods may be combined with other known methods. Other aspects, advantages and modifications within the scope of the invention will be apparent to those skilled in the art to which the invention pertains.

The invention claimed is:

1. A multilayer substrate comprising at least one layer providing tensile strength and at least one layer containing fibers with an internal strength sufficiently low to permit fiber relocation in a press forming operation, forming new bonds in, at least partly, different positions than prior to the press forming operation, wherein said substrate comprises at least three layers, including at least one central layer positioned between two outer layers, said at least one central layer comprising said at least one layer containing fibers with an internal strength sufficiently low to permit fiber relocation in a press forming operation, forming new bonds in, at least partly, different positions than prior to the press forming operation; and wherein at least one outer layer has a higher tensile strength and is thinner than the at least one central layer.

2. The multilayer substrate according to claim 1 wherein said at least one outer layer having a higher tensile strength provides a tensile strength that is at least about 10% higher than the tensile strength of the at least one central layer.

3. The multilayer substrate according to claim 1, wherein at least one of the outer layers provides the tensile strength and has a minimum tensile strength of about 75 N/m in a cross-machine direction.

4. The multilayer substrate according to claim 1, wherein the two outer layers provide the tensile strength and have a total minimum tensile strength of about 150 N/m in a machine direction.

5. The multilayer substrate according to claim 1, wherein the at least one central layer has a low initial tensile strength and a higher re-pulpability than the outer layers.

6. The multilayer substrate according to claim 1, wherein at least one of the outer layers has a higher hydrophobicity and/or oleophobicity than the at least one central layer.

7. The multilayer substrate according to claim 1, wherein at least one of the outer layers has a higher relative wet strength than the at least one central layer.

8. The multilayer substrate according to claim 1, wherein at least one of the outer layers has a higher density than the at least one central layer.

9. The multilayer substrate according to claim 1, wherein the multilayer substrate has a density below about 0.5 kg/dm$^3$.

10. The multilayer substrate according to claim 1, wherein the multilayer substrate has a grammage from about 100 to about 2000 g/m$^2$.

11. The multilayer substrate according to claim 1, wherein the multilayer substrate has a moisture content from about 4 to about 25%.

12. The multilayer substrate according to claim 1, wherein at least one of the outer layers comprises one or more additives for extra strength and wet strength.

13. A method for treating a multilayer substrate according to claim 1 for providing a multilayer product comprising the following steps:

a) providing said multilayer substrate, b) subjecting said multilayer substrate to high pressure, and c) subjecting said multilayer substrate to high temperature, thus providing a multilayer product.

14. The method according to claim 13 wherein the high pressure and high temperature of step b and/or c) is provided by a press pad device and a stamp device.

15. The method according to claim 13 wherein the multilayer substrate emanates from chemi-thermomechanical pulp, thermomechanical pulp, chemically pulped wood pulp, sulfate pulp, sulfite pulp, recycled pulp material, board or carton, or a combination thereof.

16. The method according to claim 13 wherein the multilayer substrate emanates from bleached or non-bleached pulp, or a combination thereof.

17. The method according to claim 13 wherein the multilayer substrate emanates from hardwood or softwood, bagasse, algae or straw or a combination thereof.

18. The method according to claim 13 wherein step a) is preceded by a delivery step comprising forming the multilayer substrate into a strip and subsequently folding said strip.

19. A multilayer product obtainable obtained by a method according to claim 13.

20. The multilayer product according to claim 19 wherein said product is a moulded product selected from the group consisting of a screw cap, a container, a bread clip, and a package, wherein said container is a disposable drinking cup or dairy product carton or auto-clave package or a tray, or a plate for eating or keeping food, or a paper or paperboard, wherein the paperboard is a folding boxboard.

21. The multilayer product according to claim 19 wherein said product is provided so that one of the outer layers forms threads or a click-on function for sealable packaging.

22. Use of a multilayer product according to claim 19 wherein said product is used as a part of a moulded product selected from the group consisting of a screw cap, a container, a bread clip, and a package, wherein said container is a disposable drinking cup or dairy product carton or auto-clave package or a tray, or a plate for eating or keeping food, or a paper or paperboard, wherein the paperboard is a folding boxboard.

23. Method for re-cycling a multilayer product according to claim 19 for providing re-cycled pulp comprising the following steps:

i) providing said multilayer product, ii) submerging said product into a liquid, iii) optionally adding to said liquid one or more decoupling agents, iv) exposing said product in said liquid for shear forces thus providing a re-cycled pulp.

* * * * *